Jan. 30, 1923. 1,443,673

L. J. BLACK.
GRIPPING DEVICE.
FILED AUG. 19, 1922.

Inventor:
Lee J. Black.
By Max A. Schmidt
Attorney.

Patented Jan. 30, 1923.

1,443,673

UNITED STATES PATENT OFFICE.

LEE J. BLACK, OF BEAUMONT, TEXAS.

GRIPPING DEVICE.

Application filed August 19, 1922. Serial No. 582,950.

*To all whom it may concern:*

Be it known that I, LEE J. BLACK, a citizen of the United States, residing at Beaumont, in the county of Jefferson and State of Texas, have invented certain new and useful Improvements in Gripping Devices, of which the following is a specification.

This invention relates to gripping devices used in connection with well-drilling apparatus for holding a pipe or drill stem section against downward movement in the apparatus. These devices are known as "slips", and the present invention has for its object to provide a device of this kind embodying certain novel and improved features of construction to be hereinafter described and claimed.

Figure 1:
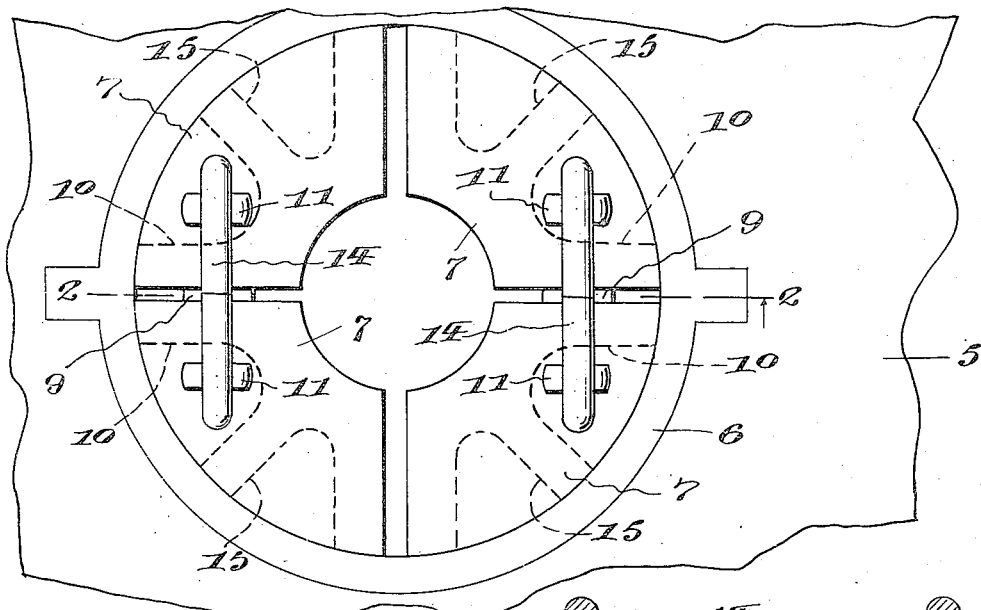
Figure 2:
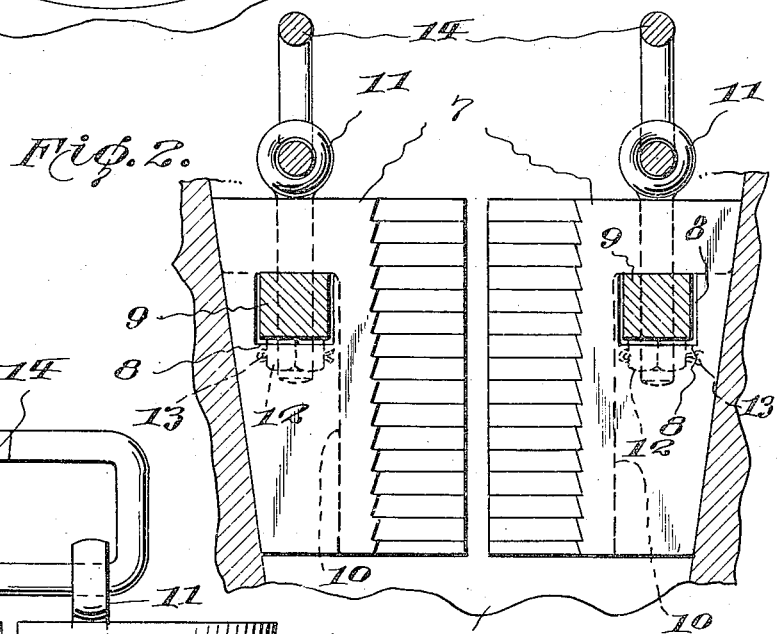
Figure 3:
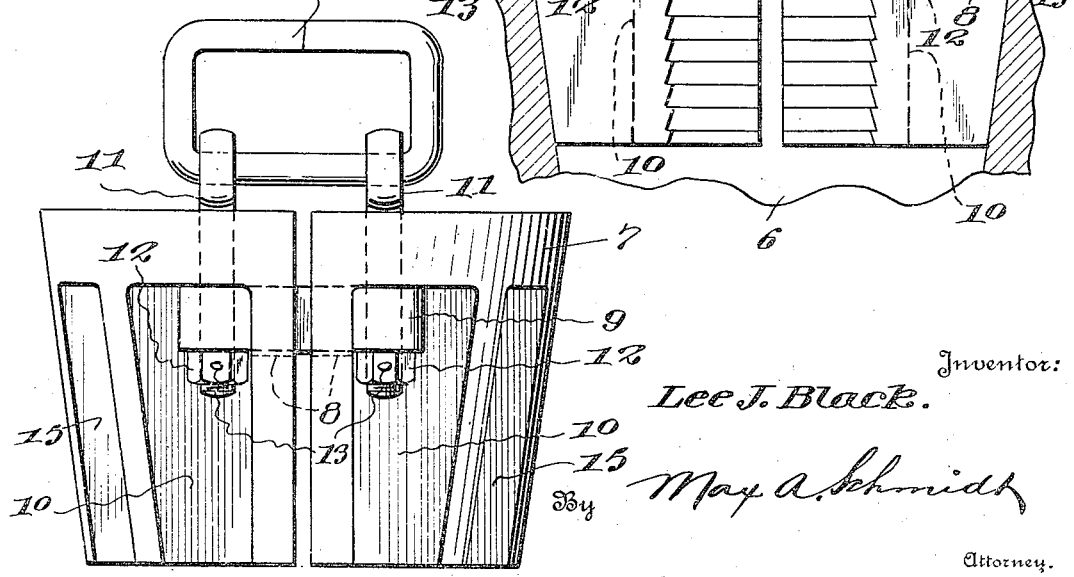

In order that the invention may be better understood, reference is had to the accompanying drawing, wherein:

Figure 1 is a plan view of a fragment of the apparatus showing the gripping devices associated therewith; Fig. 2 is a cross-section on the line 2—2 of Fig. 1, and Fig. 3 is an elevation of a pair of slips.

Referring specifically to the drawing, 5 denotes a fragment of the turntable of a rotary well-drilling machine, the same having a central opening in which is mounted a bushing 6 forming a downwardly tapered opening to receive and seat the gripping devices or slips 7 which are the subject matter of the present application for patent. These devices are arranged in a circular series to surround the pipe or other object to be gripped, and by reason of the taper of the opening in which they seat they are crowded inwardly when they move downwardly in the opening, thereby gripping the object to be held, whereas when they are elevated, they recede and release the object. The slips are tapered at the back to conform to the taper of the opening in which they seat, and their work-engaging faces are serrated to obtain a good grip.

The slips 7 are arranged in pairs, with a coupling or connection between the members of the respective pairs, so that each pair of slips may move together. It is to be understood however that the number of slips employed is immaterial and may be varied as desired, provided the aforementioned arrangement of pairing the slips is retained.

The connection between the slips 7 is made by the following means:

In the opposite ends of two adjacent slips 7 are horizontal apertures 8 which register, and in which loosely seats a block 9, the latter connecting the two slips and therefore preventing relative vertical movement thereof, and thus constraining the slips to move together in this direction. In the back or rear side of the slips are recesses 10 into which the end apertures 8 open, and into which the ends of the block 9 extend. The slips are also provided with vertical bores which extend from the top thereof to the side recesses 10, and in these bores are loosely mounted eye-bolts 11 which pass at their lower ends through the ends of the block 9 which project into the side recesses, and are fastened to said block by nuts 12 secured by cotter pins 13. Above the slips, the eye bolts 11 pivotally carry a handle 14, said eye-bolts therefore serving as the shanks of the handle.

The members of both pairs of slips 7 are connected in the manner hereinbefore described, and as each pair of slips forms a semi-circular gripping member, it is impossible for the slips to drop down through the bushing 6 even though there should be no pipe or other object to be gripped in the same. The blocks 9 firmly anchor each slip so that it cannot get away even if the eye-bolts 11 were to break, unless the slips were entirely removed from the bushing 6. The width of the apertures 8 is greater than that of the blocks 9, and hence the slips are free to adjust themselves to the varying rough outside diameters of the casing, pipe or other object to be handled, thus insuring a firm grip on the same.

The invention is shown applied to a rotary well-drilling machine, but it can also be used in connection with a casing ring or other appliance for holding a pipe or the like passing therethrough.

The slips 7 are also shown provided with side recesses 15 to reduce their weight.

I claim:

1. A gripping device comprising a circular series of slips connected in pairs, the members of each pair having apertures in their adjacent ends, a block seating in said apertures and connecting said members, and a handle having a connection with said block.

2. A gripping device comprising a circular series of slips connected in pairs, the members of each pair having apertures in their adjacent ends and side recesses, a block seating in said apertures and connecting said members, the ends of said block projecting into the side recesses, a handle above said members, shanks carrying said handle and passing through the members from the top thereof into the side recesses, and connections between said shanks and the aforesaid projecting ends of the block.

3. A gripping device comprising a circular series of slips connected in pairs, the members of each pair having apertures in their adjacent ends and side recesses, a block seating in said apertures and connecting said members, the ends of said block projecting into the side recesses, a handle above said members, shanks pivotally carrying said handle and passing through the members from the top thereof into the side recesses, and connections between said shanks and the aforesaid projecting ends of the block.

4. A gripping device comprising a circular series of slips connected in pairs, the members of each pair having apertures in their adjacent ends, a block seating in said apertures and connecting said members, and a pivoted handle having a connection with said block.

5. A gripping device comprising a circular series of slips connected in pairs, the members of each pair having apertures in their adjacent ends and side recesses, a block seating in said apertures and connecting said members, the width of the apertures being greater than the width of the block, and the ends of said block projecting into the side recesses, a handle above said members, shanks carrying said handle and passing through the members from the top thereof into the side recesses, and connections between said shanks and the aforesaid projecting ends of the block.

In testimony whereof I affix my signature.

LEE J. BLACK.